US009091312B2

(12) United States Patent
Lindemann et al.

(10) Patent No.: US 9,091,312 B2
(45) Date of Patent: Jul. 28, 2015

(54) SYMMETRICAL STRUT FOR ROCKER ONE-WAY CLUTCH

(71) Applicant: Schaeffler Technologies AG & Co. KG, Herzogenaurach (DE)

(72) Inventors: Patrick M. Lindemann, Wooster, OH (US); Markus Steinberger, Macedonia, OH (US); Jacob Rufener, Rittman, OH (US)

(73) Assignee: Scaheffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/107,662

(22) Filed: Dec. 16, 2013

(65) Prior Publication Data
US 2014/0197002 A1 Jul. 17, 2014

Related U.S. Application Data

(60) Provisional application No. 61/752,187, filed on Jan. 14, 2013.

(51) Int. Cl.
*F16D 41/12* (2006.01)
(52) U.S. Cl.
CPC ..................................... *F16D 41/12* (2013.01)
(58) Field of Classification Search
USPC ........................................................ 192/45.1
See application file for complete search history.

(56) References Cited

U.S. PATENT DOCUMENTS

| | | | | |
|---|---|---|---|---|
| 4,089,395 A * | 5/1978 | Fogelberg | .................... | 192/41 A |
| 5,064,037 A * | 11/1991 | Long, Jr. | ..................... | 192/41 A |
| 5,445,255 A * | 8/1995 | Rutke et al. | .................. | 192/45.1 |
| 5,967,267 A * | 10/1999 | Vranish | ....................... | 188/82.8 |
| 6,167,998 B1 * | 1/2001 | Kinoshita | .................... | 192/45.1 |
| 8,042,670 B2 * | 10/2011 | Bartos et al. | ................. | 192/43.1 |
| 8,083,042 B2 | 12/2011 | Samie et al. | | |
| 8,813,931 B2 * | 8/2014 | Jackwerth et al. | ........... | 192/45.1 |
| 2009/0233763 A1 * | 9/2009 | Morgan, Jr. | ..................... | 477/98 |
| 2011/0290608 A1 | 12/2011 | Bird et al. | | |
| 2012/0103745 A1 * | 5/2012 | Bird | ................................ | 192/46 |
| 2013/0213027 A1 | 8/2013 | Bird et al. | | |

FOREIGN PATENT DOCUMENTS

| | | |
|---|---|---|
| JP | 2002317828 | 10/2002 |
| JP | 2003120787 | 4/2003 |
| KR | 20100004379 | 4/2010 |

* cited by examiner

*Primary Examiner* — Rodney H Bonck
*Assistant Examiner* — Alberto Interian, III
(74) *Attorney, Agent, or Firm* — Simpson & Simpson, PLLC

(57) ABSTRACT

A one-way clutch, including: an outer race including a pocket and a strut. The strut includes a body and a retention segment. The body is at least partially locatable in the pocket. The retention segment includes a neck portion and a spring retention portion. The neck portion is directly connected to the body and extends from the body in a first direction. The spring retention portion extends from the neck portion in the first direction and includes first and second segments extending in second and third opposite directions, orthogonal to the first direction, from the neck portion.

19 Claims, 5 Drawing Sheets

SYMMETRICAL STRUT FOR ROCKER ONE-WAY CLUTCH

CROSS-REFERENCE TO RELATED APPLICATIONS

This application claims the benefit under 35 U.S.C. §119 (e) of U.S. Provisional Patent Application No. 61/752,187, filed Jan. 14, 2013, which application is incorporated herein in its entirety.

TECHNICAL FIELD

The invention relates generally to a one-way rocker clutch, in particular, a one-way rocker clutch with a symmetrical strut that provides a same functionality whether installed with a top or bottom side into a pocket for a race for the clutch.

BACKGROUND

FIG. 6 is a partial top view of prior art one-way rocker clutch in a stator for a torque converter.

FIG. 7 is a top view of a strut in FIG. 5. The following should be viewed in light of FIGS. 6 and 7. Rocker one-way clutch 200 includes inner race 202, outer race 204, and strut 206. Strut 206 includes portions 208 and 210. Portion 208 is arranged to engage with and be restrained by pocket 212 of the outer race, and includes top surface 214 and center point 216. Edge 218 of the top surface is at uniform distance 220 from the center point. Portion 208 includes segments 222 and 224. Edge 226 of segment 224 protrudes past edge 228 of segment 224. There is no protrusion extending from edge 230. Thus, portion 208 is asymmetrical with respect to line 232 passing through the center point and parallel to edges 228 and 230. When the strut is properly installed in the pocket, strut 206A, for example, edges 226 and 228 are arranged to engage and restrain spring 232 for the clutch, which urges portion 208 radially inward.

In FIG. 6, strut 206B is incorrectly installed such that the spring contacts edge 230. As a result, the contact angle between the strut and ramp 236 of the inner race is significantly and detrimentally different from the desired angle that results from proper installation of the strut. That is, the strut does not "drop into" space 238 because edge 224, rather than edge 230 is in contact with the ramp. The incorrect contact angle can result in the strut sliding past the ramp, instead of locking with surface 238 of the ramp. As a result, the designed surface contact area is reduced, resulting in higher loading of the remaining strut, which are properly engaging the ramp surfaces, and subsequent reduction in durability of the one-way clutch.

In FIG. 6, the "backward" installation of strut 206B enables the spring to slide past end 240 of the strut and/or lie along edge 230 and become jammed between the strut and the outer race. In the free-wheel mode, the strut crushes the spring as the strut is pushed toward the outer race by ramp 236A. The crushed spring causes the inner and outer races to be non-rotatably locked, which causes failure of the one-way clutch. Installation of the strut in the configuration of FIG. 6 can unintentionally occur during assembly of the clutch.

SUMMARY

According to aspects illustrated herein, there is provided a one-way clutch, including: an outer race including a pocket and a strut. The strut includes a body and a retention segment. The body is at least partially locatable in the pocket. The retention segment includes a neck portion and a spring retention portion. The neck portion is directly connected to the body and extends from the body in a first direction. The spring retention portion extends from the neck portion in the first direction and includes first and second segments extending in second and third opposite directions, orthogonal to the first direction, from the neck portion.

According to aspects illustrated herein, there is provided a stator for a torque converter, including: a plurality of blades and a one-way clutch including: an outer race located radially inward of the plurality of blades, including a pocket and formed of a same single piece of material as the plurality of blades; and a strut including a body at least partially locatable in the pocket and a retention segment. The retention segment includes: a neck portion directly connected to the body and extending from the body in a first direction; and a spring retention portion: extending from the neck portion in the first direction and including first and second segments extending in second and third opposite directions, orthogonal to the first direction, from the neck portion.

According to aspects illustrated herein, there is provided a one-way clutch, including an inner race, an outer race located radially outward of the inner race and including a pocket, and a strut including a body at least partially located in the pocket and with a top surface and an outer circumferential surface at a first uniform distance from an axis passing through the body and orthogonal to the top surface. The strut includes a retention segment including a neck portion directly connected to the body and extending from the outer circumferential surface, including a first neck surface at a first distance in a first direction from a line passing through the retention segment and the center axis, and including a second neck surface at the first distance in a second direction, opposite the first direction, from the line. The retention segment includes a spring retention portion directly connected to the neck portion, including first and second spring retention surfaces extending from the first and second neck surfaces in the first and second directions, respectively, including a third spring retention surface extending from the first spring retention surface and at a second distance, greater than the first distance, in the first direction from the line, and including a fourth spring retention surface extending from the second spring retention surface and at the second distance in the second direction from the line.

BRIEF DESCRIPTION OF THE DRAWINGS

The nature and mode of operation of the present invention will now be more fully described in the following detailed description of the invention taken with the accompanying figures, in which.

DETAILED DESCRIPTION

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
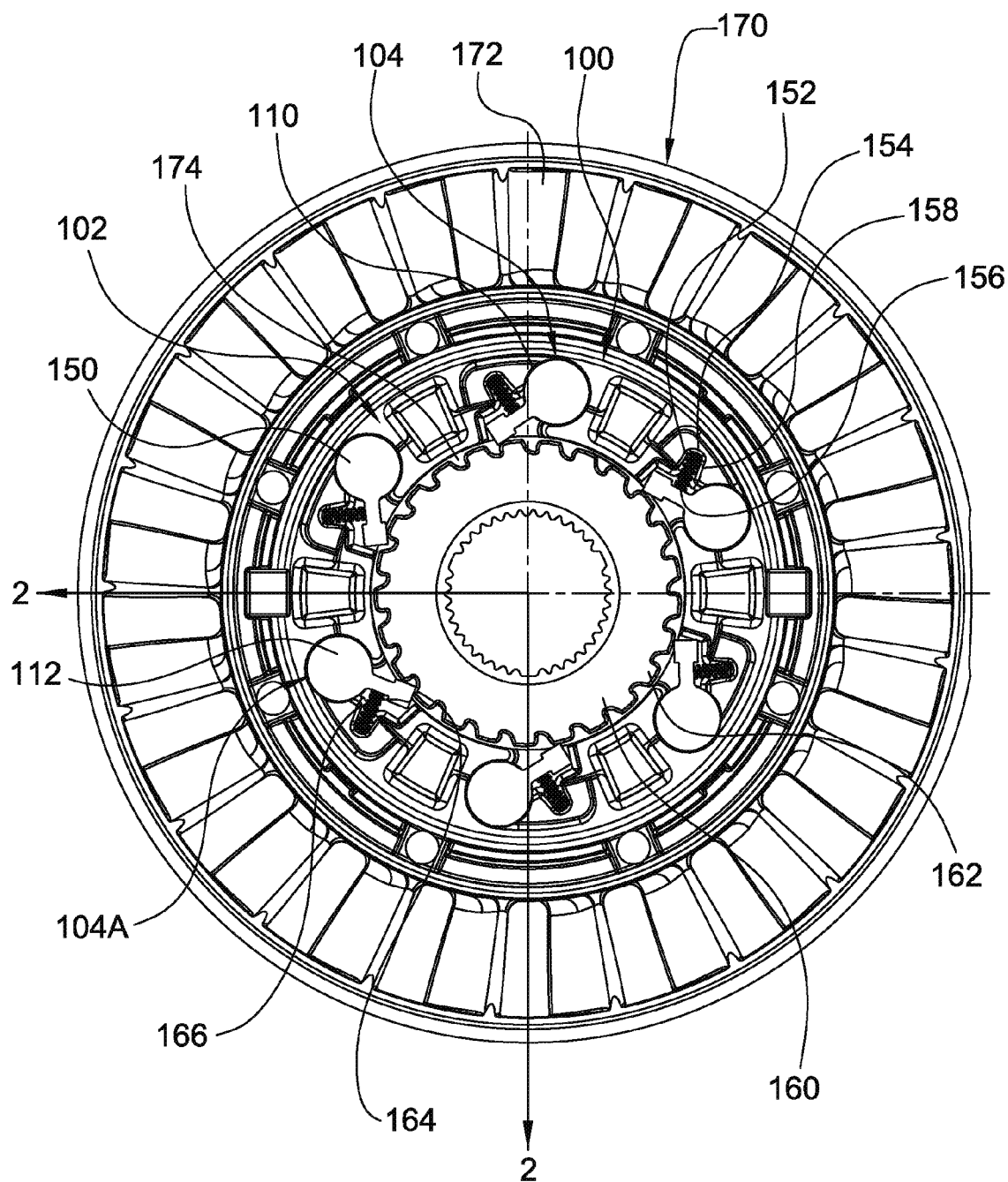
FIG. 1 is a top view of a one-way rocker clutch with a symmetrical strut in a stator for a torque converter.

FIG. 1 is a top view of a one-way rocker clutch with symmetrical strut 100 in a stator for a torque converter.

Figure 2:
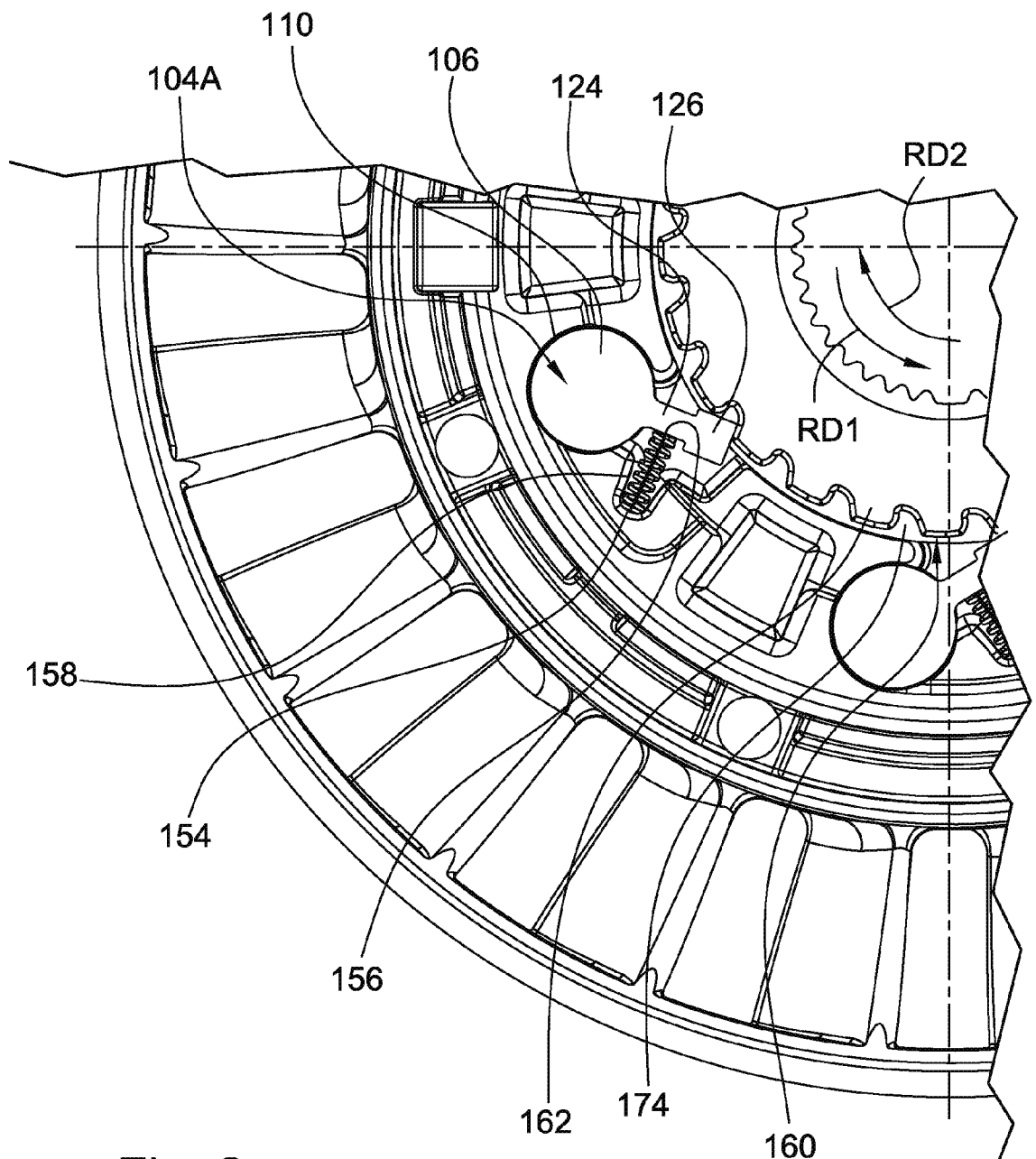
FIG. 2 is a detail of portion 2 in FIG. 1.

FIG. 2 is detail of portion 2 in FIG. 1.

Figure 3:
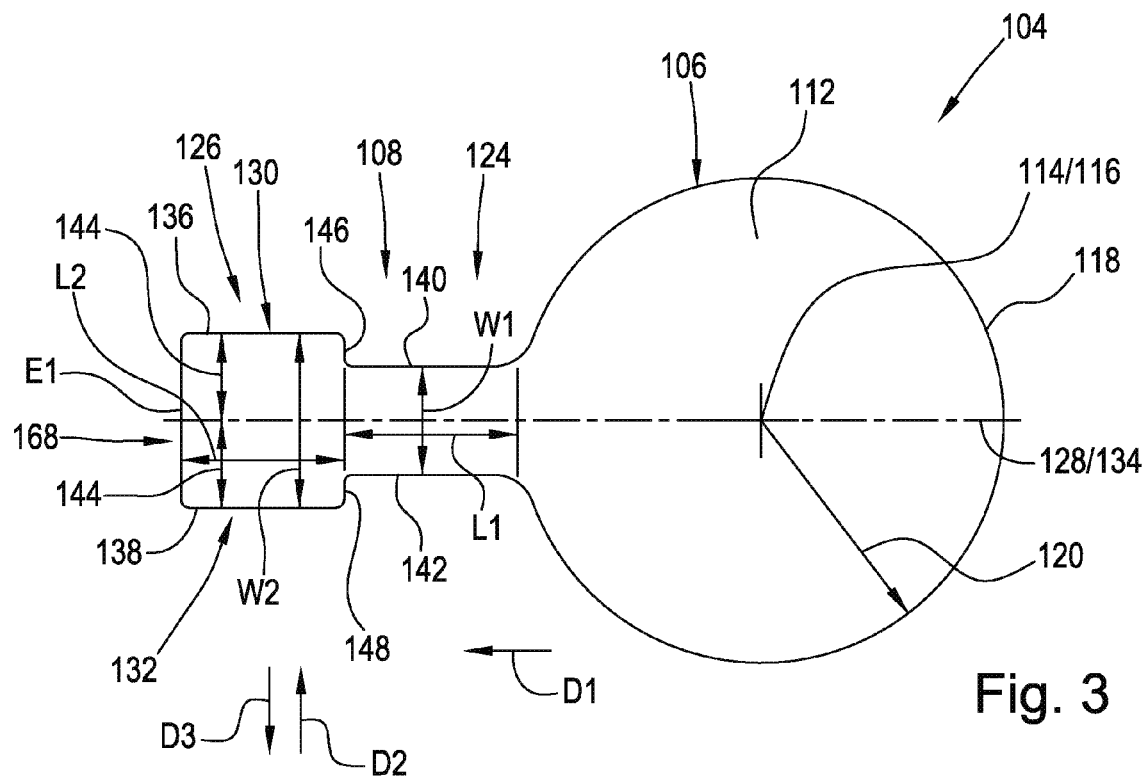
FIG. 3 is a top view of a strut in FIG. 1.

FIG. 3 is a top view of a strut in FIG. 1.

Figure 4:
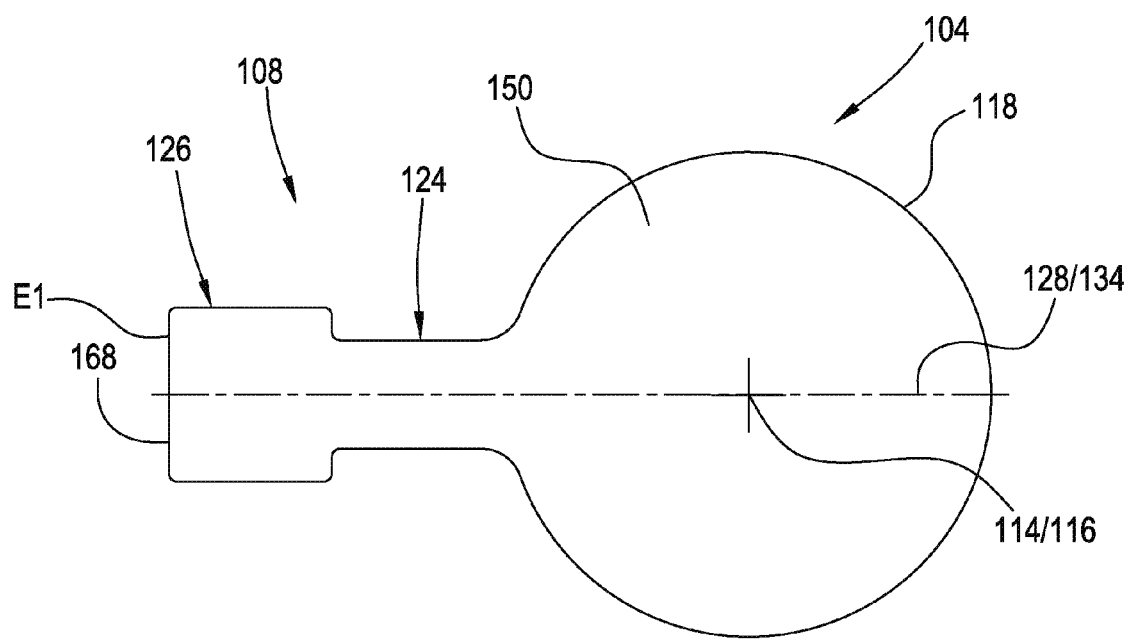
FIG. 4 is a bottom view of a strut in FIG. 1.

FIG. 4 is a bottom view of a strut in FIG. 1. The following should be viewed in light of FIGS. 1 through 4. One-way clutch 100 includes outer race 102 and strut 104. The strut includes body 106 and retention segment 108. The body is at least partially locatable in pocket 110 of the outer race. The strut includes top surface 112 with center point 114 in the body. Axis 116 passes through the center point and is orthogonal to the top surface. The body includes outer circumferential edge 118 at distance 120 from the center point. Thus, edge 118 forms a portion of a circle. The retention segment includes neck portion 124 and spring retention portion 126. The neck portion is directly connected to the body and extends from the outer circumferential edge and the outer circumferential surface in direction D1. The neck portion includes width W1 in direction D2 orthogonal to line 128 along the top surface through the neck portion and the center point in direction D1.

The spring retention portion extends from the neck portion in direction D1 and includes segment 130 extending from the neck portion in direction D2 and segment 132 extending from the neck portion in direction D3, opposite direction D2. The spring retention portion includes width W2 in direction D2 or D3, greater than width W1. In an example embodiment, width W1 is uniform along the neck portion in direction D1. In an example embodiment, width W2 is uniform along portion 126 in direction D1.

Figure 5:
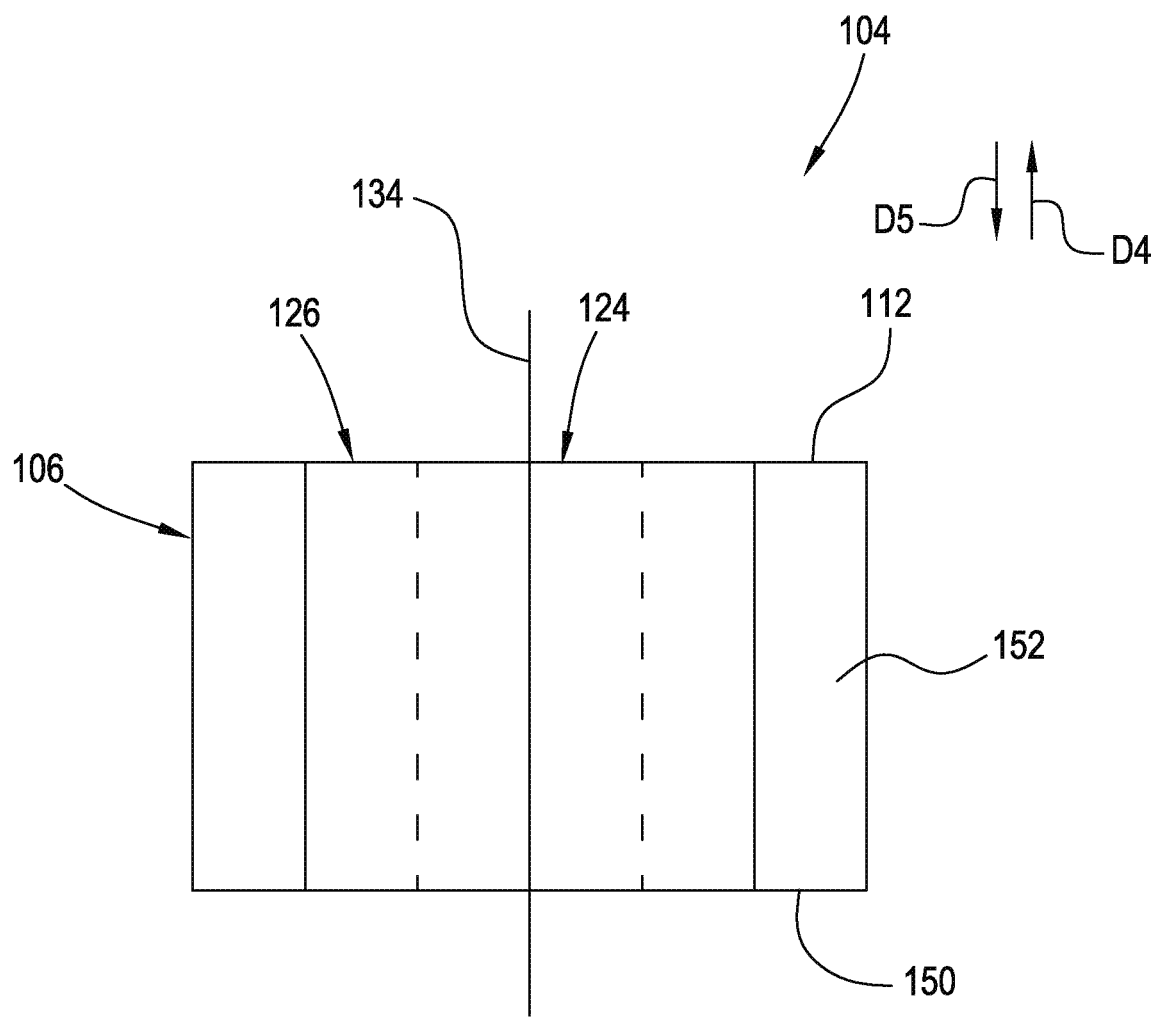
FIG. 5 is an end view from end E1 of the strut in FIGS. 3 and 4.
Figures 6, 7:
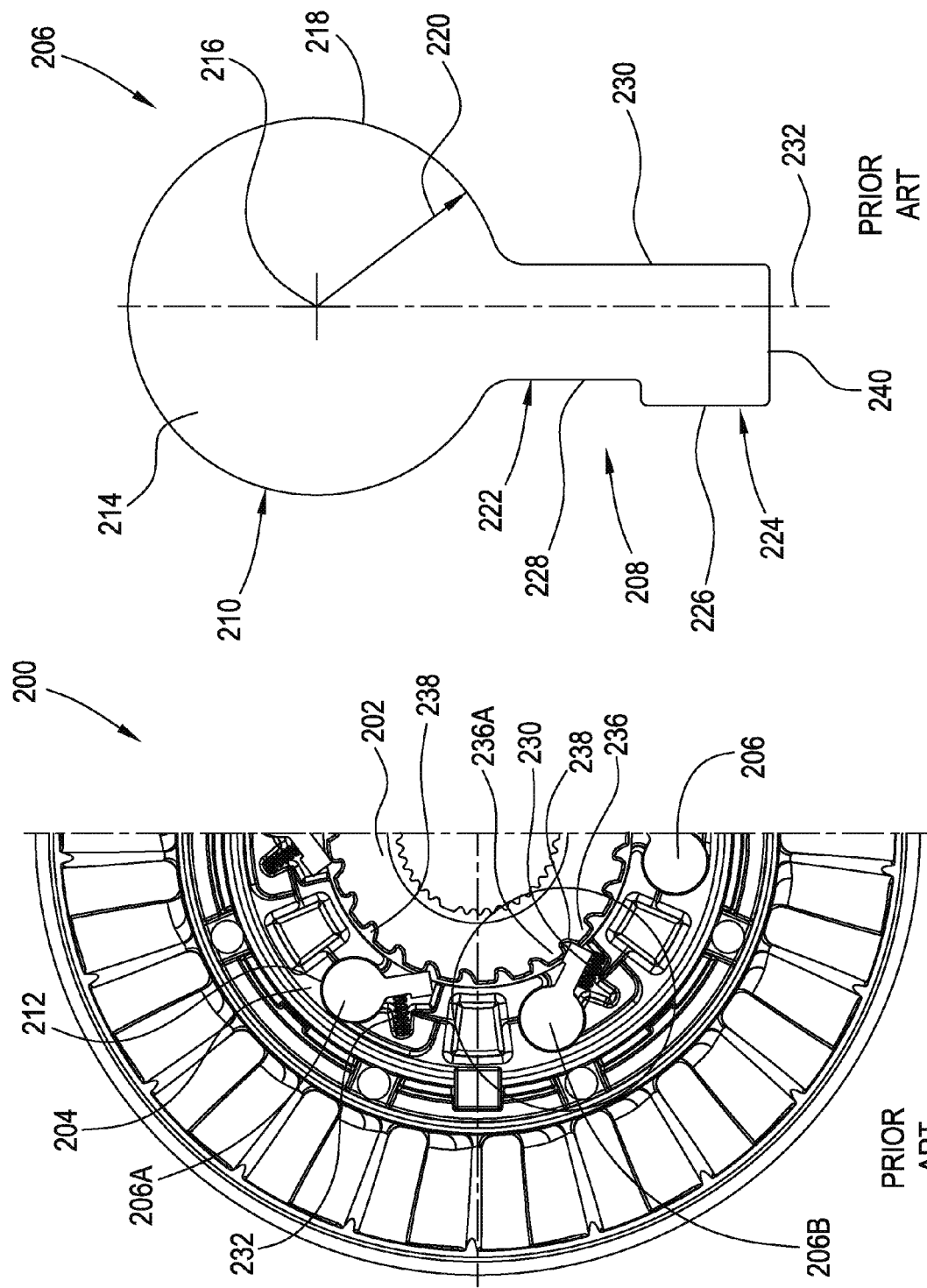
FIG. 6 is a partial top view of a prior art one-way rocker clutch in a stator for a torque converter.
FIG. 7 is a top view of a strut in FIG. 5.

FIG. 5 is an end view from end E1 of the strut in FIGS. 3 and 4. The following should be viewed in light of FIGS. 1 through 5. The retention segment is symmetrical with respect to a plane 134 passing through the retention segment and the center point, for example, orthogonal to top surface 112. By "symmetrical" we mean that the features and portions of the retention segment divided by the plane form mirror images or each other. For example, edges 136 and 138 of portion 126 are mirror images with respect to line 128 formed by the plane on the top surface.

The neck portion includes edges 140 and 142 extending from the outer circumferential edge, spanning length L1 of the neck portion, and separated by width W1. Edges 136 and 138 of portion 126 span length L2 of portion 126 and are separated by width W2. In an example embodiment, edges 136 and 138 are parallel to line 128. In an example embodiment, edges 140 and 142 are parallel to line 128. Edges 136 and 138 are at distance 144 from the line. Distance 144 is more than ½ of W1; therefore, segments 130 and 132 of the spring retention portion extend beyond the neck portion in directions D2 and D3, respectively, as noted above.

Segment 130 includes edge 146 extending from the neck portion, for example, edge 140, in direction D2 and segment 132 includes edge 148 extending from the neck portion in direction D3. In an example embodiment, edges 146 and 148 are orthogonal to line 128.

The top surface faces in direction D4. The strut includes bottom surface 150 facing in direction D5, opposite direction D4, and spanning the body and retention segment. In an example embodiment, surfaces 112 and 150 are planar and parallel. Circumferential surface 152 connects surfaces 112 and 150. In an example embodiment, surface 152 is parallel to the axis and orthogonal to surfaces 112 and 150. Surfaces 112 and 150 are symmetrical with respect to plane 134.

Clutch 100 includes spring 152 with ends 154 and 156. The outer race includes indentation 158. End 154 is disposed in the indentation and end 156 is in contact with the retention segment. The spring urges the retention segment radially inward. In an example embodiment, end 156 is in contact with the spring retention segment, in particular edges 140 and 146 or edges 142 and 148. Clutch 100 includes inner race 160 located radially inward of the outer race and including ramps 162. As is typical for a one-way clutch, for a locking mode, that is, relative rotation of the outer race with respect to the inner race in a first rotational direction (RD1 in FIG. 2), the spring urges the retention segment into contact with the inner race, for example, ramps surfaces 164 of the ramps, to non-rotatable lock the inner and outer races. In an example embodiment, contacting surfaces 164 and 166 are parallel during the locking mode. For a free wheel mode, that is, relative rotation of the outer race with respect to the inner race in an opposite rotational direction (RD2 in FIG. 2), the retention element slides across the ramps, without engaging the ramp surfaces, enabling rotation in the opposite direction. As the relative speed of rotation increases, centrifugal force overcomes the radial inward urging of the spring such that the retention portion displaces radially outward to break contact with the inner race. In an example embodiment, when the inner and outer races are not rotating, the spring urges the strut radially inward such that distal surface 166 at distal end 168 of the strut (portion 126) contacts surface 164. In an example embodiment, surfaces 164 and 166 are parallel when in contact.

In an example embodiment, clutch 100 is part of stator 170 for a torque converter. The stator includes blades 172 connected to the outer race. In an example embodiment, the outer race is located radially inward of blades 172 and is made of a same single piece of material as the blades. In an example embodiment, stator 170 and the outer race are aluminum. Distance 120 is made relatively large in order to distribute contact pressure in the outer race and stator when the struts are engaged in the locking mode. Thus, distance 120 enables the use of light weight and more easily fabricated aluminum for the stator and outer race while providing adequate structure strength for the stator and outer race.

The following provides further detail regarding clutch 100 and strut 102. Advantageously, the symmetrical configuration of strut 102 prevents the problem noted above of improper installation of the strut into a pocket for an outer race. Specifically, if top surface 112 is installed facing away from the pocket, the proper contact angle is established (contact with edge 140 and surface 152 enables the spring retention portion to "drop into" space 174 and surfaces 164 and 166 are properly oriented) and segment 130 provides the surface needed to restrain the spring and to keep the spring from sliding past end 168 of the strut in direction D1. If bottom surface 150 is installed facing away from the pocket, the proper contact angle is established (contact with edge 142 and surface 152 enables the spring retention portion to "drop into" space 174 and surfaces 164 and 166 are properly oriented) and segment 132 provides the surface needed to restrain the spring and to keep the spring from sliding past end 168 of the strut in direction D1.

Thus, due to the symmetry of the strut, the strut presents the same structure and functionality regardless of how the strut is installed in the pocket. Therefore, the assembly of the clutch can be speeded since no time/provision need be taken or made by workers or machines installing the struts to ascertain the proper orientation of the strut with respect to the pocket. Further, the reliability of the one-way clutch is improved because the symmetrical configuration of the strut prevents the strut from improper installation, preventing the jamming problem noted above.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A one-way clutch, comprising:
   an axis of rotation;
   an outer race including a pocket with an indentation;
   an inner race;
   a strut including:
   a body at least partially locatable in the pocket; and,
   a retention segment including:
      a neck portion directly connected to the body and extending from the body in a first direction; and,
      a spring retention portion:
         extending from the neck portion in the first direction; and,
         including first and second segments extending in second and third opposite directions, orthogonal to the first direction, from the neck portion; and,
      a spring:
         directly engaged with the indentation;
         directly engaged with the retention segment; and,
         urging the spring retention portion toward the inner race in a radial direction orthogonal to the axis of rotation, wherein:
      the first segment includes a first edge parallel to the second direction and directly extending from the neck portion; and,
      the second segment includes a second edge parallel to the third direction and directly extending from the neck portion.

2. The one-way clutch of claim 1, wherein:
   the body includes:
      a first top surface with a center point; and,
      an outer circumferential edge at a first distance from the center point; and,
   the second and third directions are orthogonal to a line passing through the retention segment and the center point in the first direction.

3. The one-way clutch of claim 1, wherein:
   the neck portion includes a first width in the second or third direction; and,
   the spring retention portion includes a second width, greater than the first width, in the second or third direction.

4. The one-way clutch of claim 1, wherein the retention segment is symmetrical, in the second and third directions, with respect to a plane passing through the retention segment and a center point.

5. The one-way clutch of claim 1, wherein:
   the body includes a first top surface with a center point;
   the spring retention portion has a length in the first direction;
   the first segment of the spring retention portion includes a first edge spanning the length of the spring retention portion and at a first distance from a line passing through the retention segment and the center point in the first direction; and,
   the second segment of the spring retention portion includes a second edge spanning the length of the spring retention portion and at the first distance from the line.

6. The one-way clutch of claim 1, wherein:
   the body includes a first top surface with a center point;
   the spring retention portion has a length in the first direction;
   the first segment of the spring retention portion includes a first edge parallel to a line passing through the retention segment and the center point in the first direction and at a first distance from the line; and,
   the second segment of the spring retention portion includes a second edge parallel to the line and at the first distance from the line.

7. The one-way clutch of claim 1, wherein the strut includes:
   a planar top surface facing in a fourth direction and spanning the body and the retention segment;
   a planar bottom surface facing in a fifth direction, opposite the fourth direction, and spanning the body and the retention segment; and,
   a circumferential surface connecting the planar top and bottom surfaces.

8. The one-way clutch of claim 7, wherein:
   the planar top and bottom surfaces include respective center points connected by an axis; and,
   the planar top and bottom surfaces are symmetrical with respect to a plane co-linear with the axis and passing through the spring retention portion.

9. The one-way clutch of claim 1, wherein:
   the spring includes first and second ends
   the first end of the spring is disposed in the indentation; and,
   the second end of the spring is in contact with the retention segment.

10. The one-way clutch of claim 9, wherein the second end of the spring is in contact with the spring retention portion.

11. The one-way clutch of claim 1, wherein:
    for relative rotation of the inner and outer races in a first rotational direction, the spring urges the retention segment into contact with the inner race to non-rotatable lock the inner and outer races.

12. The one-way clutch of claim 1, wherein:
    the inner race includes a ramp surface; and,
    when the inner and outer races are not rotating, a distal surface at a distal end of the strut formed by the spring retention portion is engageable with the ramp surface such that the distal surface is parallel to the ramp surface.

13. A stator for a torque converter, comprising:
    a plurality of blades; and,
    a one-way clutch including:

an outer race:
  located radially inward of the plurality of blades;
  including a pocket with an indentation; and,
  formed of a same single piece of material as the plurality of blades;
a strut including:
  a body at least partially locatable in the pocket; and,
  a retention segment including:
    a neck portion directly connected to the body and extending from the body in a first direction; and,
    a spring retention portion:
      extending from the neck portion in the first direction; and,
      including first and second segments extending in second and third opposite directions, orthogonal to the first direction, from the neck portion; and,
a spring:
  directly engaged with the outer race outside of the pocket;
  directly engaged with the retention segment; and,
  urging the spring retention portion toward the inner race in a radial direction orthogonal to an axis of rotation, wherein:
the first segment includes a first edge parallel to the second direction and directly extending from the neck portion; and,
the second segment includes a second edge parallel to the third direction and directly extending from the neck portion.

14. The stator of claim 13, wherein:
the body includes an outer circumferential surface at a first uniform distance from an axis passing through the body;
the retention segment extends from the outer circumferential surface;
the neck portion includes first and second neck surfaces separated by a first width in the second direction;
the spring retention portion is directly connected to the neck portion and extends from the first and second neck surfaces;
the first segment includes a first spring retention surface at a first distance, in the second direction, from the line; and,
the second segment includes a second spring retention surface at the first distance, in the third direction, from the line, wherein the first distance is more than ½ the first width.

15. The stator of claim 14, wherein the spring retention portion includes:
a third spring extension surface including the first edge and connecting the first neck and spring retention surfaces; and,
a fourth spring extension surface including the second edge and connecting the second neck and spring retention surfaces.

16. The stator of claim 14, wherein the strut is symmetrical with respect to a plane:
co-linear with the axis passing through the body; and,
passing through the retention segment.

17. The stator of claim 13, further comprising:
an inner race located radially inward of the outer race, wherein:
  the first end of the spring is disposed in the indentation;
  the second end of the spring is in contact with the retention segment; and,
  for relative rotation of the inner and outer races in a first rotational direction, the spring urges the retention segment into contact with the inner race to non-rotatable lock the inner and outer races.

18. The stator of claim 13, wherein the outer race is made of aluminum.

19. A one-way clutch, comprising:
an inner race;
an outer race located radially outward of the inner race and including a pocket;
a strut including:
  a body at least partially located in the pocket and with:
    a top surface including an edge forming a portion of a circle, the top surface facing in an axial direction; and,
    an outer circumferential surface at a first uniform distance from a center axis passing through the body and orthogonal to the top surface; and,
  a retention segment including:
    a neck portion:
      directly connected to the body and extending from the outer circumferential surface in a first direction;
      including a first neck surface at a first distance in a second direction, orthogonal to the first direction, from a line, in the first direction, passing through the retention segment and the center axis; and,
      including a second neck surface at the first distance in a third direction, opposite the second direction, from the line; and,
    a spring retention portion:
      directly connected to the neck portion;
      including first and second spring retention surfaces extending from the first and second neck surfaces in the second and third directions, respectively;
      including a third spring retention surface extending from the first spring retention surface and at a second distance, greater than the first distance, in the second direction from the line; and,
      including a fourth spring retention surface extending from the second spring retention surface and at the second distance in the third direction from the line.

* * * * *